(12) United States Patent
Takaichi

(10) Patent No.: US 7,134,051 B2
(45) Date of Patent: Nov. 7, 2006

(54) DISK MEMORY DEVICE, DISK MEMORY DEVICE DEFECT DETECTING METHOD, AND PROGRAM RECORDING MEDIUM

(75) Inventor: Noriaki Takaichi, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 528 days.

(21) Appl. No.: 10/332,618

(22) PCT Filed: May 10, 2002

(86) PCT No.: PCT/JP02/04560

§ 371 (c)(1),
(2), (4) Date: Jan. 10, 2003

(87) PCT Pub. No.: WO02/101744

PCT Pub. Date: Dec. 19, 2002

(65) Prior Publication Data

US 2003/0149918 A1    Aug. 7, 2003

(30) Foreign Application Priority Data

May 11, 2001  (JP)  ............................... 2001-142234

(51) Int. Cl.
*G06F 11/00* (2006.01)
(52) U.S. Cl. .............................. 714/42; 714/48; 714/55
(58) Field of Classification Search .................. 714/55, 714/53, 48, 47, 8
See application file for complete search history.

(56) References Cited

U.S. PATENT DOCUMENTS

| | | | | |
|---|---|---|---|---|
| 5,157,666 A | * | 10/1992 | Chen et al. .................. | 714/718 |
| 5,388,254 A | * | 2/1995 | Betz et al. ..................... | 714/16 |
| 5,812,752 A | * | 9/1998 | Yamada .......................... | 714/5 |
| 6,115,544 A | * | 9/2000 | Mueller ........................ | 714/57 |
| 6,182,022 B1 | * | 1/2001 | Mayle et al. ................ | 702/182 |
| 6,393,580 B1 | | 5/2002 | Harada | |
| 6,625,755 B1 | * | 9/2003 | Hirata et al. ................... | 714/17 |
| 6,738,924 B1 | * | 5/2004 | Williams et al. ............... | 714/7 |
| 6,918,054 B1 | * | 7/2005 | Hirata et al. ................... | 714/17 |

FOREIGN PATENT DOCUMENTS

| | | |
|---|---|---|
| JP | 6-111460 | 4/1994 |
| JP | 08305502 A * | 11/1996 |
| JP | 10-27437 | 1/1998 |
| JP | 11-86454 | 3/1999 |
| JP | 2000-100086 | 4/2000 |
| JP | 2001-297541 | 10/2001 |
| KR | 1998-075473 | 11/1998 |
| WO | 99/39347 | 8/1999 |

* cited by examiner

*Primary Examiner*—Scott Baderman
*Assistant Examiner*—Loan Truong
(74) *Attorney, Agent, or Firm*—Wenderoth, Lind & Ponack, L.L.P.

(57) ABSTRACT

A disk memory device is provided that measures a time for reading or writing a prescribed amount of data with an access time measurement part, compares access time data with a previously set limit time with an access time defect determining part, and, when the access time data exceeds the limit time, determines that a corresponding area on a disk memory (4) is defective, and enters the area into a defect list so that the corresponding area is not used. Thereby, when the disk memory device is used for recording/reproducing AV data, data access is performed within a prescribed time, so that videos are reproduced without interruption or data is recorded without lack of frame.

6 Claims, 8 Drawing Sheets

| | | |
|---|---|---|
| 21 write access time data | maximum access time | ~23 |
| | access time frequency distribution data | ~24 |
| | mode value | ~25 |
| | arithmetic mean value | ~26 |
| 22 read access time data | maximum access time | ~27 |
| | access time frequency distribution data | ~28 |
| | mode value | ~29 |
| | arithmetic mean value | ~30 |

Fig.7

| |
|---|
| access time frequency of 0~ 5ms |
| access time frequency of 5~10ms |
| access time frequency of 10~15ms |
| access time frequency of 15~20ms |
| access time frequency of 20~25ms |
| access time frequency of 25~30ms |
| access time frequency of 30~35ms |
| access time frequency of 35~40ms |
| access time frequency of 40~45ms |
| ⋮ |
| access time frequency of 95~100ms |
| access time frequency of 100ms and more |

DISK MEMORY DEVICE, DISK MEMORY DEVICE DEFECT DETECTING METHOD, AND PROGRAM RECORDING MEDIUM

TECHNICAL FIELD

The present invention relates to a disk memory device for recording or reading data on/from a disk memory medium such as a magnetic disk or a magneto-optical disc and, more particularly, to a method for determining a defect of the disk memory device, which includes a determination of a defect position on the disk memory medium.

BACKGROUND ART

In a disk memory device, in a case where a deficiency due to a flaw or the like exists on a disk memory medium on which data are recorded, when the data written in a sector including the deficiency portion is read, a read error sometimes occurs. Further, when the deficiency portion exists in a servo signal part on the disk memory medium, which part has previously been recorded for positioning a head structure, the deficiency portion adversely affects the accuracy of the head structure positioning and, thus, a position of a target sector from/into which data is to be read or written can not be specified. In this case, a read error or a write error for the target sector sometimes occurs.

Accordingly, since the sector on the disk memory medium where an error occurs in writing or reading is unreliable, when the disk memory device reads or writes data, generally, such sector is skipped or substituted by a spare sector, so that the sector where the error occurs is not used.

Conventionally, in order to perform the substitution process or the like for the error portion on the disk memory medium, a process of checking a defect position on the disk memory medium is performed by conducting a test of writing and reading data into/from all sectors on the disk memory medium to previously judge the existence of a read or write error.

In the conventional process of checking the defect position on the disk memory medium, even when writing/reading fails once in the writing/reading test, it is not judged that the sector has an error if data can be normally written or read after several times of recovery process.

For example, in the disk memory device, when a deficiency due to a flaw or the like exists on the disk memory medium on which data are to be recorded, and a read error occurs in reading the data which are written in a sector including the deficiency portion, the disk memory device generally attempts error correction by a data correction process such as ECC correction, or performs an error recovery process of attempting several times of data reading from the sector where the read error occurs until the data are normally read. Also, when the deficiency portion exists in the servo signal part and adversely affects the accuracy of the head structure positioning and, thus, the position of the target sector from/into which the data are to be read or written cannot be specified, the disk memory device usually performs a head structure positioning recovery process of attempting several times of position specifying process until the position of the target sector is specified.

When the conventional disk memory device can normally read or write data from/into the sector on the disk memory medium by executing the above-described recovery process, it is not judged that the sector has an error even when the data reading or writing requires a longer time than usual.

However, when the above-described disk memory device is employed for recording/reproducing AV data, it is required to read or write required data from/on the disk memory medium of the disk memory device within a prescribed time so as to reproduce video without interruption or record data without lack of frames. Accordingly, when the disk memory device is employed for recording/reproducing AV data, it is required to assure that the reading or writing process is finished within the prescribed time, and in addition, that the stored data are normally read. In the conventional sector defect determining method, it is impossible to determine a position which requires an access time longer than the prescribed time, as defective, and thus when data are recorded or reproduced in/from the position, there occurs lack of data at the recording or lack of frame at the reproduction.

The present invention is made to solve the above-described conventional problems and has for its object to provide a disk memory device which is able to reproduce videos without interruption or record pictures without lack of frame when the disk memory device is employed for recording/reproducing AV data, a disk memory device defect determining method, and a recording medium storing a program for processing the determining method by a computer.

SUMMARY OF THE INVENTION

According to a first aspect of the present invention, there is provided a disk memory device comprising: an access time measurement part for measuring a time for reading or writing a prescribed amount of data; a limit time setting part for setting limit times for reading and writing the prescribed amount of data; an access time defect determining part for comparing the measured access time with the set limit time to determine a defect in an accessed area according to whether the access time is longer than the limit time or not; and a defect entry part for entering a position of an area which is determined as defective by the access time defect determining part, into a defect list, as a defective area position.

Therefore, it is possible that a data storage position which cannot be accessed within a prescribed time is detected and the detected defective sector or defective sector block is skipped or substituted by a spare sector so as not to be used, whereby when the disk memory device is employed for recording/reproducing AV data, the disk memory device can read or write required data from/on a disk memory medium within the prescribed time so as to reproduce video without interruption or to record data without lack of frame.

According to a second aspect of the present invention, there is provided a disk memory device defect determining method comprising: measuring a time for reading or writing a prescribed amount of data; previously setting limit times for reading and writing the prescribed amount of data; and comparing the measured access time with the set limit time to determine a defect in an accessed area according to whether the access time is longer than the limit time or not.

Therefore, a data storage position which cannot be accessed within a prescribed time is detected and, thus, the detected defective sector or defective sector block can be skipped or substituted by a spare sector so as not to be used.

According to a third aspect of the present invention, there is provided a program recording medium in which a program for making a computer execute a defect determining process of a disk memory device is recorded, the defect determining process comprising: measuring a time for reading or writing a prescribed amount of data; previously setting limit times for reading and writing the prescribed amount of data; and comparing the measured access time with the set limit time to determine a defect in an accessed area according to whether the access time is longer than the limit time or not.

Therefore, a data storage position which cannot be accessed within a prescribed time is detected by a computer process, and the detected defective sector or defective sector block can be skipped or substituted by a spare sector so as not to be used.

According to a fourth aspect of the present invention, there is provided a disk memory device comprising: an access time measurement part for measuring a time for reading or writing a prescribed amount of data; an access time data storage part for storing the measured access time; a reference time data storage part for storing data of an access time which is measured for the whole access area at manufacture of the disk memory device, as reference time data; and a defect determining part for comparing the access time data with the reference time data to determine a defect of the disk memory device.

Therefore, performance degradation after manufacture of the disk memory device can be judged.

According to a fifth aspect of the present invention, there is provided a disk memory device defect determining method comprising: measuring a time for reading or writing a prescribed amount of data and storing the measured access time as access time data; storing data of an access time which is measured for the whole access area at manufacture of a disk memory device, as reference time data; and comparing the stored access time data with the stored reference time data to determine a defect of the disk memory device.

Therefore, performance degradation after manufacture of the disk memory device can be judged.

According to a sixth aspect of the present invention, there is provided a program recording medium in which a program for making a computer execute a defect determining process of a disk memory device is recorded, the defect determining process comprising: measuring a time for reading or writing a prescribed amount of data and storing the measured access time as access time data; storing data of an access time which is measured for the whole access area at manufacture of the disk memory device, as reference time data; and comparing the stored access time data with the stored reference time data to determine a defect of the disk memory device.

Therefore, performance degradation after manufacture of the disk memory device can be judged by a computer process.

According to a seventh aspect of the present invention, there is provided a disk memory device comprising: an access time measurement part for measuring a time for reading or writing a prescribed amount of data; an access time data storage part for storing the measured access time; a reference time data storage part for storing data of an access time which is measured for the whole access area at manufacture of the disk memory device, as reference time data; a defect determining part for comparing the access time data with the reference time data to determine a defect of the disk memory device; and a defect notification part for notifying a host device for controlling the disk memory device or a display part for displaying data, of the defect of the disk memory device when it is judged that the disk memory device is defective from the result of the determination by the defect determining part.

Therefore, when the defect determining part of the disk memory device judges that the disk memory device is defective, it is possible to take a measure such as saving data recorded on a disk memory medium in the disk memory device into another recording medium or exchanging the disk memory device.

According to an eighth aspect of the present invention, there is provided a disk memory device defect determining method comprising: measuring a time for reading or writing a prescribed amount of data and storing the measured access time as access time data; storing data of an access time which is measured for the whole access area at manufacture of a disk memory device, as reference time data; comparing the stored access time data with the stored reference time data to determine a defect of the disk memory device; and notifying a host device for controlling the disk memory device or a display part for displaying data, of the defect of the disk memory device when it is determined that the disk memory device is defective in the defect determination.

Therefore, it is possible to take a measure such as saving data in the disk memory device into another recording medium or exchanging the disk memory device.

According to a ninth aspect of the present invention, there is provided a program recording medium in which a program for making a computer execute a defect determining process of a disk memory device is recorded, the defect determining process comprising: measuring a time for reading or writing a prescribed amount of data and storing the measured access time as access time data; storing data of an access time which is measured for the whole access area at manufacture of the disk memory device, as reference time data; comparing the stored access time data with the stored reference time data to determine a defect of the disk memory device; and notifying a host device for controlling the disk memory device or a display part for displaying data, of the defect of the disk memory device when it is determined that the disk memory device is defective in the defect determination.

Therefore, it is possible to take a measure such as saving data in the disk memory device into another recording medium or exchanging the disk memory device.

DETAILED DESCRIPTION OF THE INVENTION

Embodiment 1

Hereinafter, a first embodiment of the present invention will be described with reference to FIGS. 1 and 2.

Figure 1:
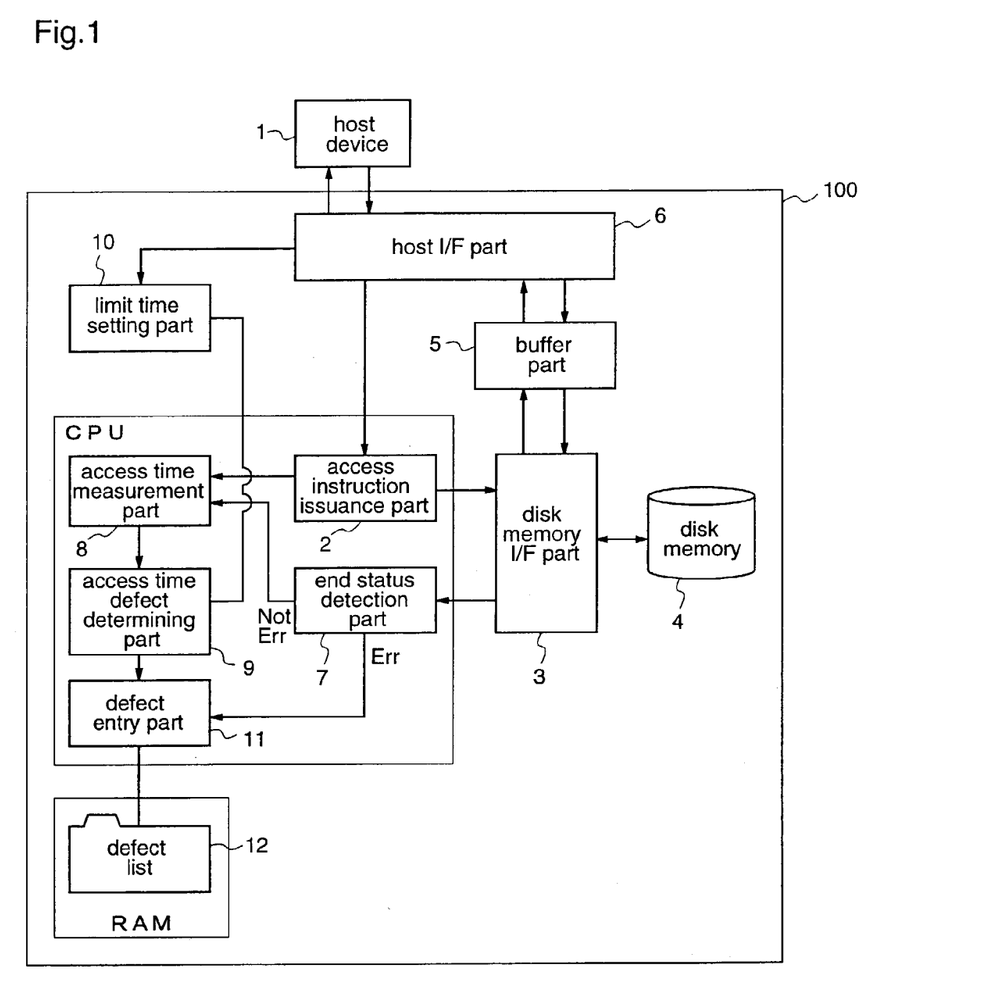
FIG. 1 is a block diagram illustrating an example of a construction of a disk memory device according to a first embodiment of the present invention.
Figure 2:
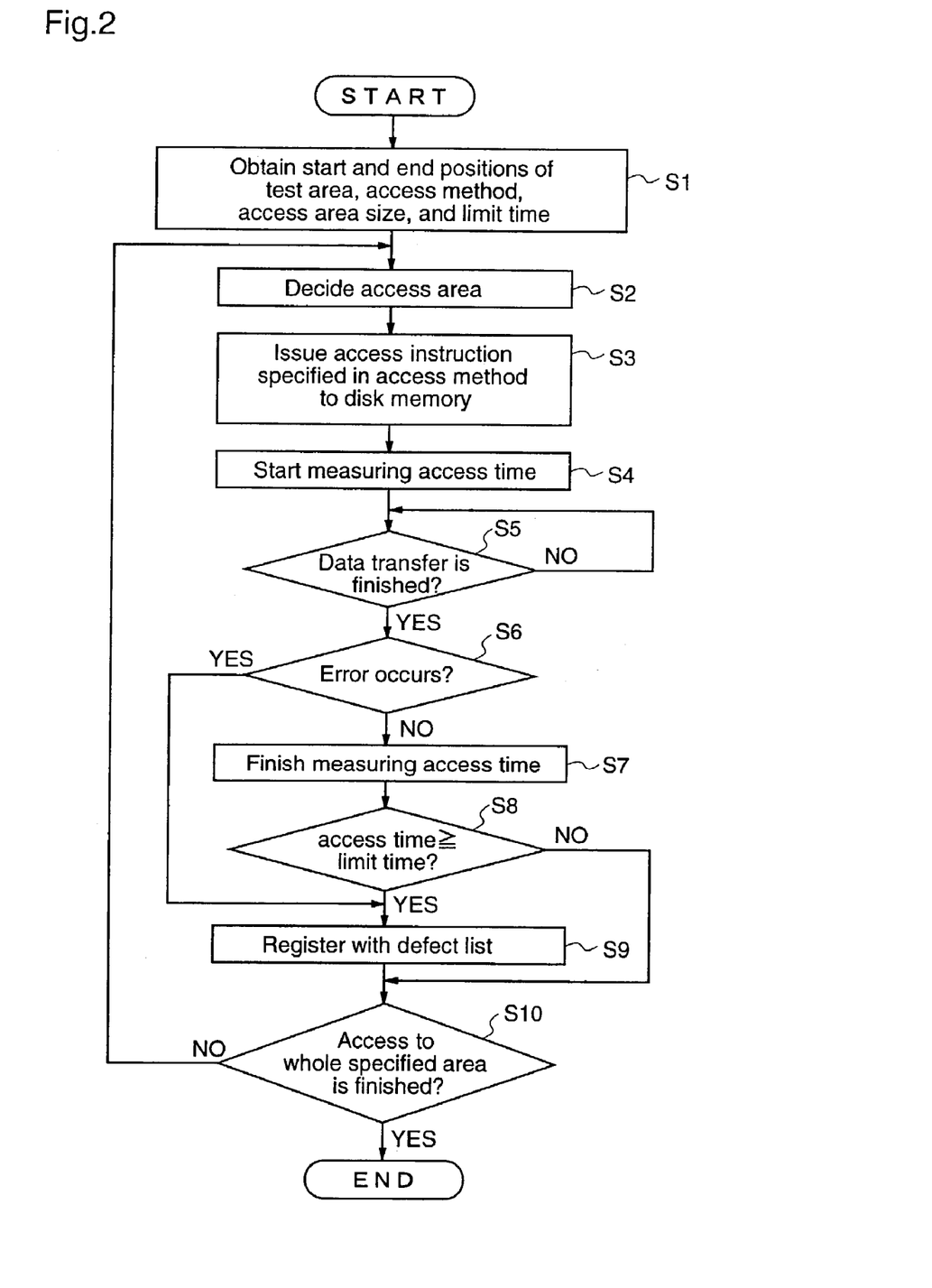
FIG. 2 is a flowchart illustrating an example of a process of the disk memory device according to the first embodiment of the invention.

FIG. 1 is a block diagram as an example illustrating a construction of a disk memory device according to the first embodiment of the present invention. In the drawing, a host device 1 outputs a test start instruction to a disk memory device 100 to instruct the same to conduct a test of an area on a disk memory 4 which is a recording area in the disk memory device 100.

The disk memory device 100 according to the first embodiment of the present invention comprises an access instruction issuance part 2, a disk memory I/F part 3, a disk memory 4, a buffer part 5, a host I/F part 6, an end status detection part 7, an access time measurement part 8, an access time defect determining part 9, a limit time setting part 10, a defect entry part 11, and a defect list 12.

When the access instruction issuance part 2 receives the test start instruction from the host device 1 through the host I/F part 6, the access instruction issuance part 2 instructs the disk memory I/F part 3 to sequentially read or write data from/into a prescribed size of area on the disk memory 4, as well as instructs the access time measurement part 8 to start, measuring an access time. When the disk memory I/F part 3 finishes accessing the prescribed size of area on the disk memory 4, the access instruction issuance part 2 instructs the disk memory I/F part 3 and the access time measurement part 8 to repeat the above-described process for a next prescribed size of area, so that an entire specified area on the disk memory 4 is accessed while shifting the same by the prescribed size.

The disk memory I/F part 3 controls data transfer to/from the disk memory 4, and reads data from the disk memory 4 to store the data in the buffer part 5, or writes the data stored in the buffer part 5 into the disk memory 4.

The end status detection part 7 detects an end status of the access from the disk memory I/F part 3 to the disk memory 4 and, when an error occurs, notifies the defect entry part 11 of a position of an area on the disk memory 4 where the error occurs. On the other hand, when no error occurs, the end status detection part 7 instructs the access time measurement part 8 to finish measuring the access time.

The access time measurement part 8 measures, as an access time, a period of time from when it receives the access time measurement start instruction from the access instruction issuance part 2 to when it receives the access time measurement finish instruction from the end status detection part 7.

The limit time setting part 10 sets limit times for reading and writing prescribed amount of data from the host device 1 through the host I/F part 6, and stores the set limit times. The limit time setting part 10 may be an input device which can set a value, such as a dip switch, and a memory.

The access time defect determining part 9 compares the access time measured by the access time measurement part 8 with the limit time set by the limit time setting part 10, to check whether the access time is longer than the limit time or not and, when the access time is longer than the limit time, notifies the defect entry part 11 of a position of an accessed area on the disk memory 4 as a defective position.

The defect entry part 11 enters the position of the defective area into the defect list 12 on the basis of the notifications of the defective area detection from the end status detection part 7 and the access time defect determining part 9.

Next, processing to be performed by the disk memory device 100 according to the first embodiment of the present invention will be described with reference to a flowchart shown in FIG. 2. FIG. 2 is a flowchart illustrating a series of processes to be performed by the disk memory device according to the first embodiment of the present invention.

Initially, the access instruction issuance part 2 obtains the test start instruction, as well as start and end positions of the specified area on the disk memory 4 where a test is to be conducted, an access method (only writing, only reading, writing and reading), the size of an area for one access as an access area size, and a limit time for the access to the access area size, from the host device 1 through the host I/F part 6 (step S1).

Then, the obtained access limit time is stored in the limit time setting part 10, and the other variables are stored in the access instruction issuance part 2. Further, the various kinds of variables obtained from the host device 1, i.e., the start and end positions of the specified area on the disk memory 4 where the test is to be conducted, the access method (only writing, only reading, writing and reading), the size of an area for one access as an access area size, and the access limit time for the access area size, can be fixedly stored in the disk memory device 100. In this case, the host device 1 has only to issue the test start instruction.

The access instruction issuance part 2 which has received the various kinds of variables decides an access area on the disk memory 4 so that the specified area on the disk memory 4 where the test is to be conducted is sequentially accessed from the start position, for every access area size (step S2).

Then, the access instruction issuance part 2 issues the access instruction which is specified in the access method obtained in step S1 to the disk memory through the disk memory I/F part 3, for the access area decided in step S2 (step S3), as well as issues the access time measurement start instruction to the access time measurement part 8 to instruct the same to start measuring an access time. The access time measurement part 8 starts measuring the access time (step S4).

The end status detection part 7 waits for a notification of an end of data transfer between the disk memory I/F part 3 and the disk memory 4, from the disk memory I/F part 3 (step S5).

When the end status detection part 7 receives the notification of the data transfer end from the disk memory I/F part 3 in step S5, the end status detection part 7 detects a data transfer error which has occurred between the disk memory I/F part 3 and the disk memory 4, or an error which has occurred in the disk memory 4, on the basis of a process end status which is contents of the process end notification received from the disk memory I/F part 3 (step S6).

When the process end status detection part 7 detects the occurrence of the error in step S6, the defect entry part 11 enters the access area where the error has occurred into the defect list 12 (step S9).

On the other hand, when the process end status detection part 7 does not detect occurrence of the error in step S6, the end status detection part 7 instructs the access time measurement part 8 to finish measuring the access time, thereby finishing the measurement of the access time (step S7).

The access time defect determining part 9 compares the access time measured by the access time measurement part 8 in step S7 with the limit time stored in the limit time setting part 10 (step S8).

As the result of the comparison in step S8, when the access time is longer than the limit time, the defect entry part 11 enters this access area into the defect list 12 (step S9).

Then, the access instruction issuance part 2 confirms whether the entire specified area on the disk memory 4 has been accessed or not, and when the access is not completed, the processes from step S2 to step S9 are repeated.

As described above, according to the first embodiment, the disk memory device 100 is provided with the access time measurement part 8 for measuring a time for reading or writing a prescribed amount of data on the disk memory 4, the limit time setting part 10 for setting limit times for reading and writing the prescribed amount of data, and the access time defect determining part 9 which compares the measured access time with the set limit time to determine a defect in the accessed area according to whether the access time is longer than the limit time or not. Therefore, a data storage position on the disk memory 4 which cannot be accessed within the prescribed time can be detected, and a defective sector or a defective sector block including the data storage position can be skipped or substituted by a spare sector so that the defective sector or the sector block is not used. Thus, when the disk memory device is employed for recording/reproducing AV data, the disk memory device 100 can read or write required data from/into the disk memory 4 within the prescribed time so as to reproduce video without interruption or to record the data without lack of frame.

In the disk memory device 100 of the first embodiment, the determination of a defect in an accessed area on the disk memory 4 may be realized by software.

Embodiment 2

Next, a second embodiment of the present invention will be described with reference to FIGS. 3 to 7.

According to the second embodiment, when a disk memory device is employed for recording/reproducing AV data to reproduce video without interruption or to record the data without lack of frame, the disk memory device judges not only the existence of defective area on a disk memory 4 so that the defective area is skipped or substituted, but also the life of the disk memory device used for recording/reproducing the AV data on the basis of each piece of information on an access time at manufacture of the disk memory device so as to prevent degradation in on-track performance and increase in retrial process, which are caused by degradation in performance of the disk memory device.

Figure 3:
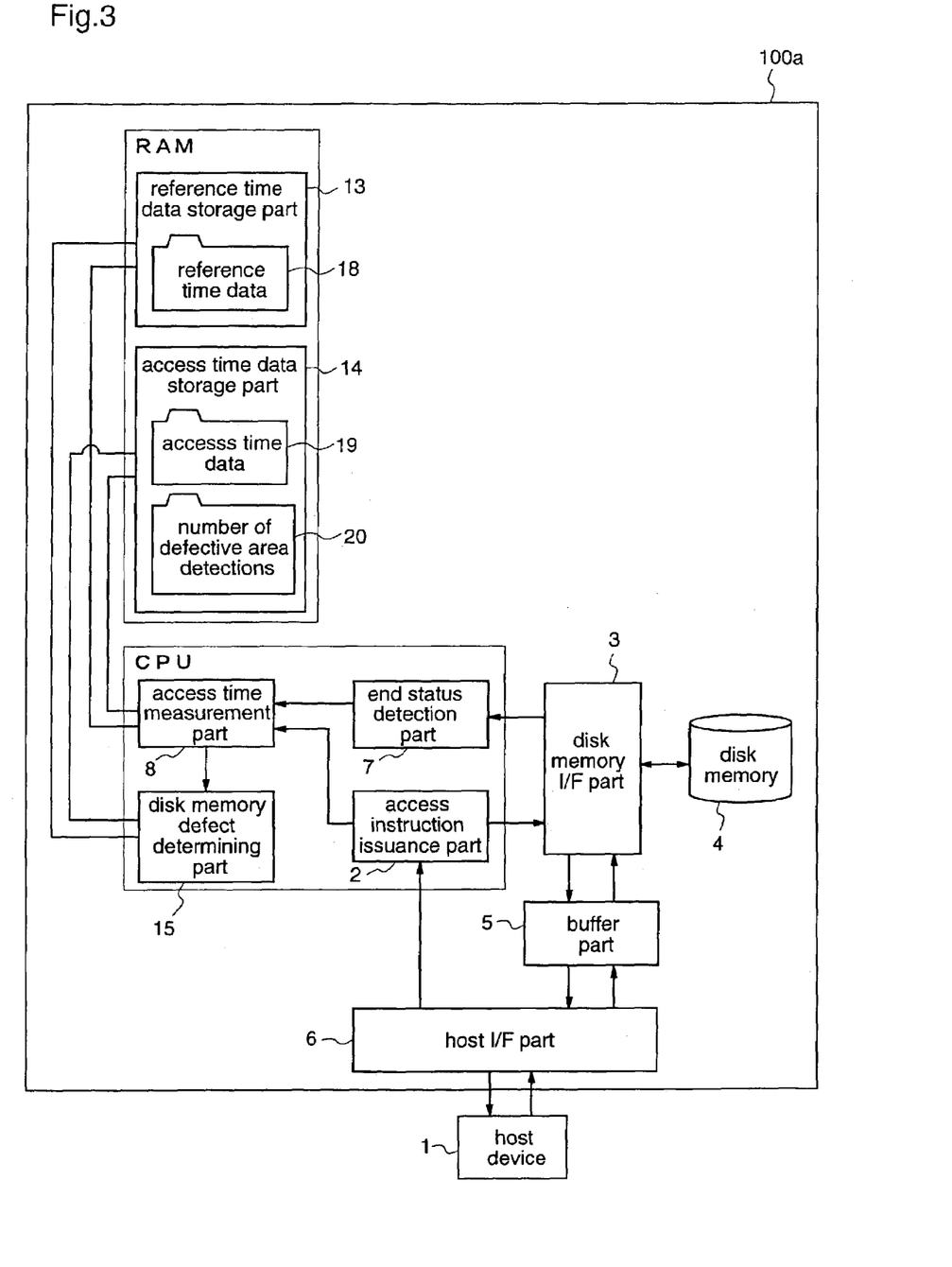
FIG. 3 is a block diagram illustrating an example of a construction of a disk memory device according to a second embodiment of the present invention.

FIG. 3 is a block diagram as an example illustrating a construction of the disk memory device according to the second embodiment of the present invention. In the drawing, a host device 1 outputs a test start instruction to a disk memory device 100a to instruct the same to conduct a test of an area on the disk memory 4. Further, the host device 1 outputs an access instruction to the disk memory device 100a to instruct the same to read data recorded in the disk memory 4 or write data therein.

The disk memory device 100a according to the second embodiment of the present invention comprises an access instruction issuance part 2, a disk memory I/F part 3, the disk memory 4, a buffer part 5, a host I/F part 6, an end status detection part 7, an access time measurement part 8, a reference time data storage part 13, an access time data storage part 14, and a disk memory defect determining part 15.

Initially, at manufacture of the disk memory device 100a, when the access instruction issuance part 2 receives the test start instruction from the host device 1 through the host I/F part 6, the access instruction issuance part 2 instructs the disk memory I/F part 3 to sequentially read or write data from/into an area on the disk memory 4 by the prescribed size of area, as well as instructs the access time measurement part 8 to start measuring an access time. When the above-described accessing process is finished, the process is repeated to access a next prescribed size of area on the disk memory 4, so that an entire specified area on the disk memory 4 is accessed while shifting the specified area by the prescribed size.

The disk memory I/F part 3 controls data transfer to/from the disk memory 4, and reads data from the disk memory 4 to store in the buffer part 5 or writes the data stored in the buffer part 5 into the disk memory 4.

The end status detection part 7 detects an end status of the access from the disk memory I/F part 3 to the disk memory 4, and instructs the access time measurement part 8 to finish measuring the access time.

The access time measurement part 8 measures, as an access time, a period of time from when it receives the access time measurement start instruction from the access instruction issuance part 2 to when it receives the access time measurement finish instruction from the end status detection part 7, and updates reference time data 18 on the reference time data storage part 13. The reference time data 18 stored in the reference time data storage part 13 will be described later.

Next, at use of the disk memory 4, when the access instruction issuance part 2 receives the access instruction for the prescribed amount of data area from the host device 1 through the host I/F part 6, the access instruction issuance part 2 instructs the disk memory I/F part 3 to a read or write data from/into a corresponding area on the disk memory 4, as well as instructs the access time measurement part 8 to start measuring the access time.

The disk memory I/F part 3 controls data transfer to/from the disk memory 4, and reads data from the disk memory 4 to store the data in the buffer part 5, or writes the data stored in the buffer part 5 into the disk memory 4.

The host I/F part 6 controls transfer of a command and data to/from the host device 1, and outputs the data stored in the buffer part 5 to the host device 1 or stores data outputted from the host device 1 into the buffer part 5.

The end status detection part 7 detects the end status of the access from the disk memory I/F part 3 to the disk memory 4, and instructs the access time measurement part 8 to finish measuring the access time.

The access time measurement part 8 measures, as an access time, a period of time from when it receives the access time measurement start instruction from the access instruction issuance part 2 to when it receives the access time measurement finish instruction from the end status detection part 7, and updates access time data 19 on the access time data storage part 14. The access time data 19 stored in the access time data storage part 14 will be described later.

The disk memory defect determining part 15 checks whether or not the access time measured by the access time measurement part 8 is longer than a prescribed time by which an area on the disk memory 4 is judged as defective.

Further, every time data access occurs by a prescribed number of times, the disk memory defect determining part 15 compares the access time data 19 stored in the access time data storage part 14 with the reference time data 18 stored in the reference time data storage part 13 to check the existence of defective area in the disk memory 4 or degradation in performance of the whole disk memory 4.

Figure 6:
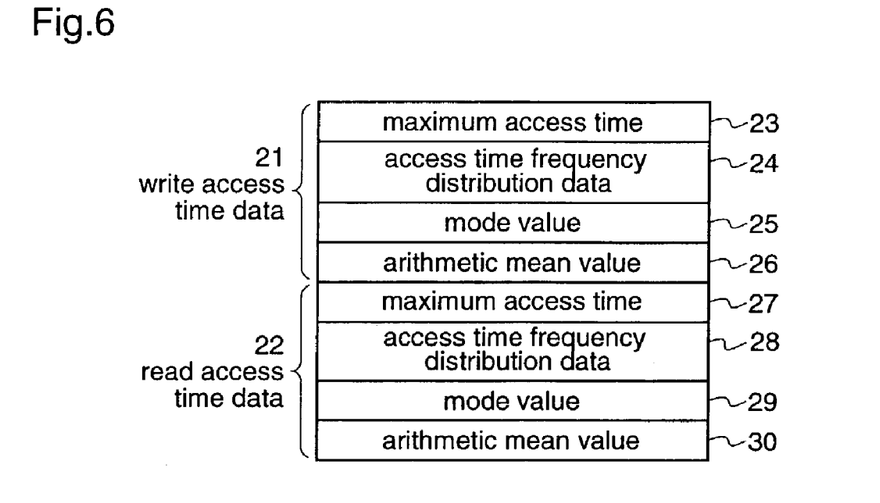
FIG. 6 is a diagram illustrating an example of structures of reference time data and access time data according to the second embodiment of the invention.
Figure 7:
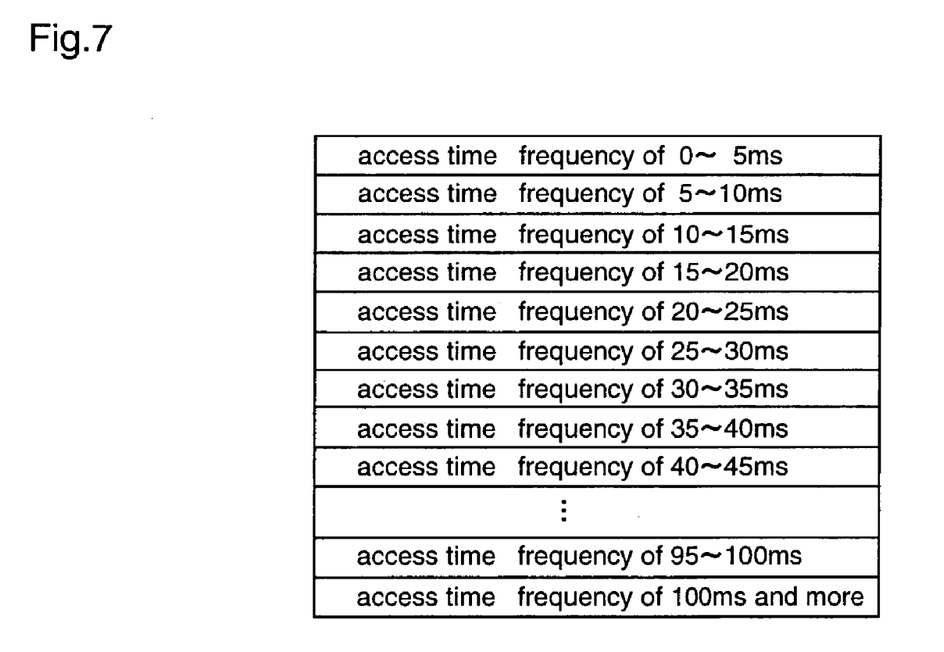
FIG. 7 is a diagram illustrating an example of a structure of access time frequency distribution data according to the second embodiment of the invention.

Here, descriptions will be given of the reference time data 18 stored in the reference time data storage part 13 and the access time data 19 stored in the access time data storage part 14, with reference to FIGS. 6 and 7.

The reference time data 18 and the access time data 19 have the same format. The reference time data 18 is created on the basis of data of an access time which is measured as a reference of an access time for the specified area on the disk memory 4 when the disk memory device 100a is manufactured. The access time data 19 is updated by access time data that is obtained by measuring the access time for the prescribed amount of data area on the disk memory 4 when the disk memory 4 is used.

The reference time data 18 and the access time data 19 are constituted by write access time data 21 and read access time data 22, each being constituted by a maximum access time 23 or 27, access time frequency distribution data 24 or 28 which is divided into classes according to the access time, a mode value 25 or 29 which is calculated on the basis of the access time frequency distribution data, and an arithmetic mean value 26 or 30. As shown in FIG. 7, the width of the class of the access time data frequency distribution data 24 or 28 is 5 ms, and a range from 0 to 100 ms is divided into the classes, thereby measuring the frequency. The format is decided in consideration of access performance of the target disk memory 4.

When the maximum access time, the mode value, or the arithmetic mean value of the access time data 19 is larger than each data of the reference time data 18 by a prescribed value or more, it is judged that the performance of the disk memory 4 is degraded.

Next, a process of the disk memory device 100a according to the second embodiment of the present invention will be described with reference to flowcharts shown in FIGS. 4 and 5.

Figure 4:
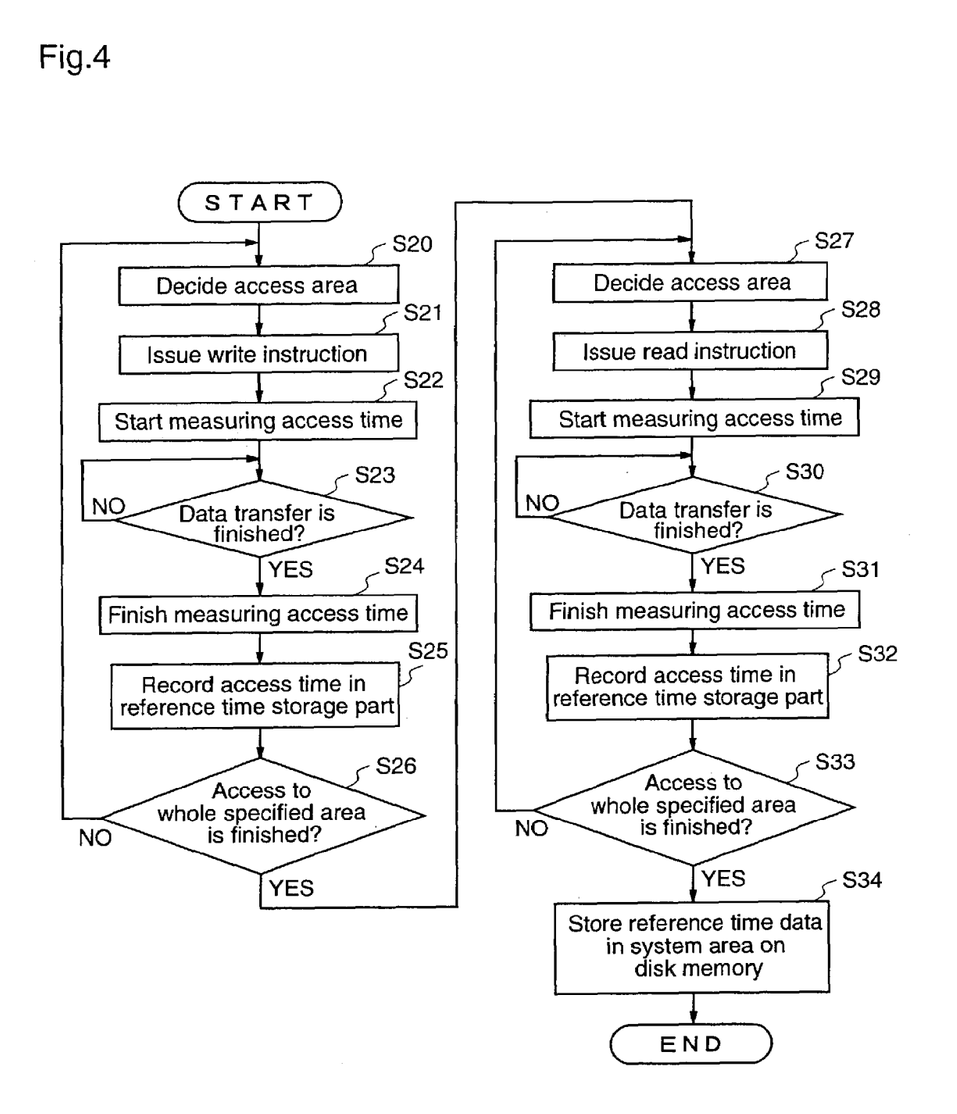
FIG. 4 is a flowchart illustrating an example of a process at manufacture of the disk memory device according to the second embodiment of the invention.
Figure 5:
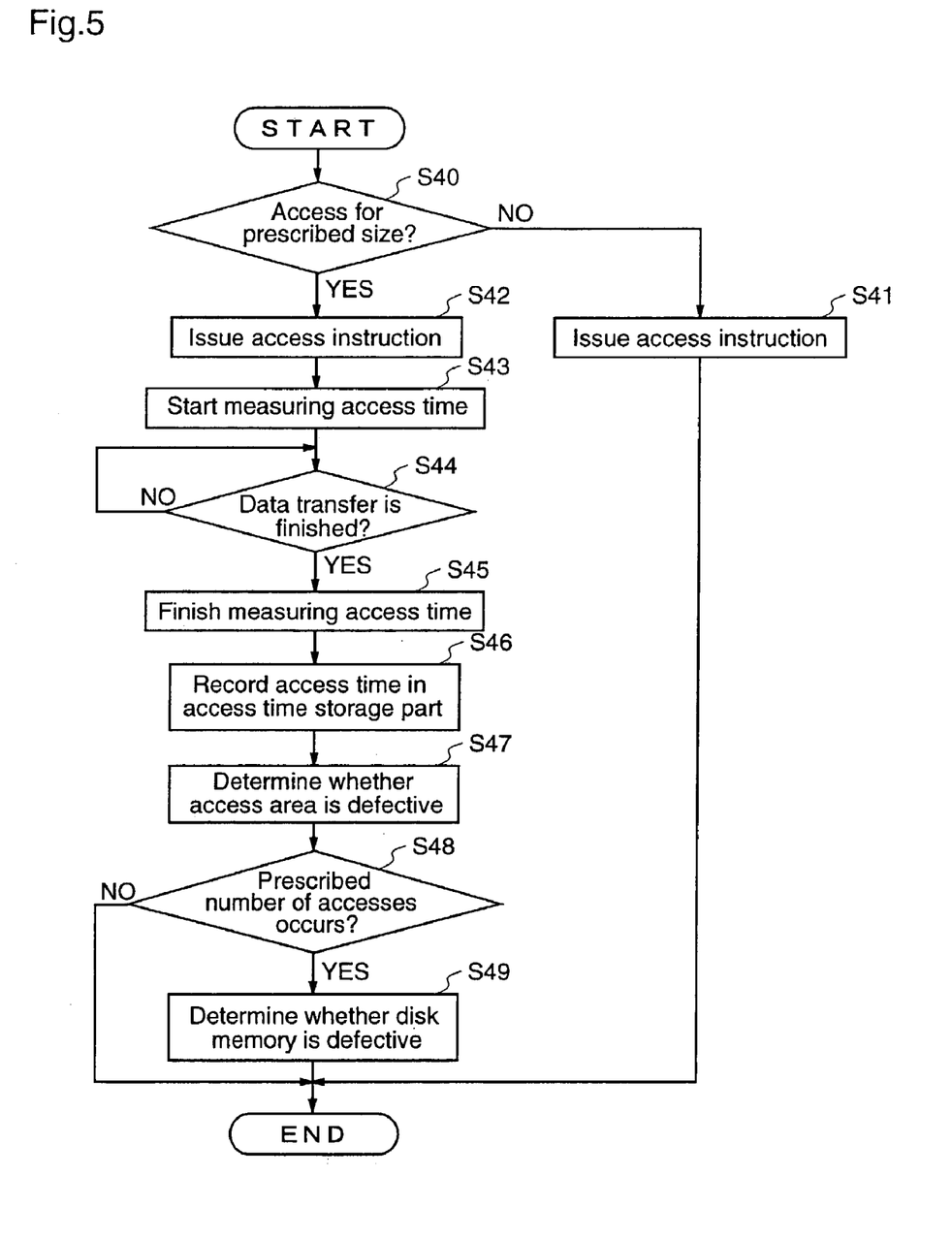
FIG. 5 is a flowchart illustrating an example of a process at use of the disk memory device according to the second embodiment of the invention.

FIG. 4 is a flowchart illustrating a series of process at manufacture of the disk memory device according to the second embodiment of the present invention. FIG. 5 is a flowchart illustrating a series of process at use of the disk memory device according to the second embodiment of the present invention.

Initially, the process of the disk memory device 100a at manufacture thereof will be described with reference to FIG. 4.

At manufacture of the disk memory device 100a, when the access instruction issuance part 2 receives the test start instruction from the host device 1 through the host I/F part 6, the access instruction issuance part 2 decides an access area so that an access test is sequentially conducted for the entire data area on the disk memory 4, in ascending order of addresses, by every prescribed size of area (step S20).

Next, the access instruction issuance part 2 issues a write access instruction to the disk memory 4 through the disk memory I/F part 3 for the access area on the disk memory 4 which is decided in step S20 (step S21), as well as issues an access time measurement start instruction to the access time measurement part 8 to instruct the same to start measuring an access time. Then, the access time measurement part 8 starts measuring the access time (step S22).

The end status detection part 7 waits for a notification of an end of the data transfer between the disk memory I/F part 3 and the disk memory 4, from the disk memory I/F part 3 (step S23).

In step S22, when the end status detection part 7 receives the notification of the data transfer end from the disk memory I/F part 3, the end status detection part 7 instructs the access time measurement part 8 to finish measuring the access time, and the access time measurement part 8 finishes the measurement of the access time (step S24).

The access time measurement part 8 updates the reference time data 18 on the reference time data storage part 13 on the basis of the measured access time (step S25).

Then, the access instruction issuance part 2 confirms whether the entire data area on the disk memory 4 is accessed, and when the access is not completed yet, the process from step S20 to step S25 is repeated.

After a series of process from step S20 to step S25 is finished for the whole data area on the disk memory 4 with respect to the write access, in order to execute the same process with respect to a read access, the access instruction issuance part 2 receives the test start instruction from the host device 1 through the host I/F part 6, and decides an access area to sequentially conduct the access test for the whole data area of the disk memory 4, in ascending order of addresses, by every predetermined size of area (step S27).

Then, the access instruction issuance part 2 issues a read access instruction to the disk memory 4 through the disk memory I/F part 3 for the area decided in step S27 (step S28), as well as issues the access time measurement start instruction to the access time measurement part 8, so that the access time measurement part 8 starts measuring the access time (step S29).

Then, the end status detection part 7 waits for the notification of an end of the data transfer between the disk memory I/F part 3 and the disk memory 4, from the disk memory I/F part 3 (step S30).

When the end status detection part 7 receives the notification of the data transfer end from the disk memory I/F part 3 in step S29, the end status detection part 7 instructs the access time measurement part 8 to finish measuring the access time, and the access time measurement part 8 finishes the measurement of the access time (step S31).

Then, the access time measurement part 8 updates the reference time data 18 on the reference time data storage part 13 on the basis of the measured access time (step S32).

The access instruction issuance part 2 confirms whether the whole data area of the disk memory 4 has been accessed or not (step S33), and when the access is not completed yet, the processes from step S27 to step S32 are repeated.

When the access to the whole data area of the disk memory 4 is finished, the reference time data 18 relating to the access time of the disk memory device 100a at measurement thereof, which is created on the reference time data storage part 13, is stored in a system area on the disk memory 4 through the disk memory I/F part 3 (step S34).

It is assumed that the reference time data 18 stored in the system area on the disk memory 4 is read into the reference time data storage part on a RAM when power of the disk memory device 100a is applied.

Next, the process of the disk memory device 100a at use of the disk memory 4 will be described with reference to FIG. 5.

Initially, at use of the disk memory, when the access instruction issuance part 2 receives the access instruction from the host device 1 through the host I/F part 6, the access instruction issuance part 2 checks whether the access instruction targets at a prescribed amount of data area (step S40).

When the access instruction does not target at the prescribed amount of data area in step S40, the access instruction issuance part 2 issues an access instruction for the corresponding area on the disk memory 4 to the disk memory 4 through the disk memory I/F part 3 (step S41), and the process is finished.

On the other hand, when the access instruction targets at the prescribed amount of data area (step S40), the access instruction issuance part 2 issues an access instruction for the corresponding area on the disk memory 4 to the disk memory 4 through the disk memory I/F part 3 (step S42), as well as issues the access time measurement start instruction to the access time measurement part 8 to instruct the same to start the measure of the access time. The access time measurement part 8 starts measuring the access time (step S43).

Then, the end status detection part 7 waits for a notification of an end of the data transfer between the disk memory I/F part 3 and the disk memory 4, from the disk memory I/F part 3 (step S44)

When the end status detection part 7 receives the notification of the data transfer end from the disk memory I/F part 3 in step S44, the end status detection part 7 instructs the access time measurement part 8 to finish measuring the access time, and the access time measurement part 8 finishes the measurement of the access time (step S45).

Then, the access time measurement part 8 updates the access time data 19 on the access time data storage part 14 on the basis of the measured access time (step S46).

The disk memory defect determining part 15 checks whether the access time measured in step S45 is longer than a prescribed time by which the access area is judged as defective, and when the access time is longer than the prescribed time, the disk memory defect determining part 15 updates the number of defective area detections 20 on the access time data storage part 14 (step S47).

Further, the disk memory defect determining part 15 measures the number of times the access time data is acquired, and checks whether the number of access time data acquisitions reaches a prescribed number of times or not (step S48).

When the number of access time data acquisitions reaches the prescribed number of times, the disk memory defect determining part 15 compares the access time data 19 stored in the access time data storage part 14 with the reference time data 18 stored in the reference time data storage part 13, and checks the existence of defective area in the disk memory 4 or performance degradation of the whole disk memory 4 (step S49), and the process is finished.

It is assumed that the access time data 19 and the number of defective area 20 which are stored in the access time data storage part 14 are stored in the system area on the disk memory 4 at a timing in which the data transfer process of the disk memory device 100a is not prevented, and the access time data 19 and the number of defective area detections 20 stored in the system area on the disk memory 4 are read into the reference time data storage part 13 on the RAM when power is applied to the disk memory device 100a.

As described above, according to the second embodiment, the disk memory device 100a is provided with the access time measurement part 8 for measuring a time for reading or writing a prescribed amount of data, the access time data storage part 14 for storing the above-described measured access time as the access time data 19, the reference time data storage part 13 for storing the access time which is measured for the whole access area at manufacture of the disk memory device, as the reference time data 18, and the disk memory defect determining part 15 for comparing the access time data 19 with the reference time data 18 to determine the existence of defective area in the disk memory 4 or performance degradation thereof. Therefore, when the disk memory device 100a is employed for recording/reproducing AV data, the disk memory device 100a can read or write required data from/into the disk memory 4 within a prescribed time so as to reproduce video without interruption or to record data without lack of frame. Further, performance degradation of the disk memory 4 after manufacture of the disk memory device can be judged, whereby degradation in on-track performance or increase in retrial process, which are caused by degradation in performance of the disk memory 4, can be prevented.

In the disk memory device 100a of the second embodiment, the determination of a defect in an accessed area on the disk memory 4 may be realized by software.

Embodiment 3

Next, a third embodiment of the present invention will be described with reference to FIGS. 8 and 9.

According to the third embodiment, a disk memory device judges degradation in performance of a disk memory after manufacture of the disk memory device and, further, issues a warning to a host device or a user when the disk memory is judged as defective.

Figure 8:
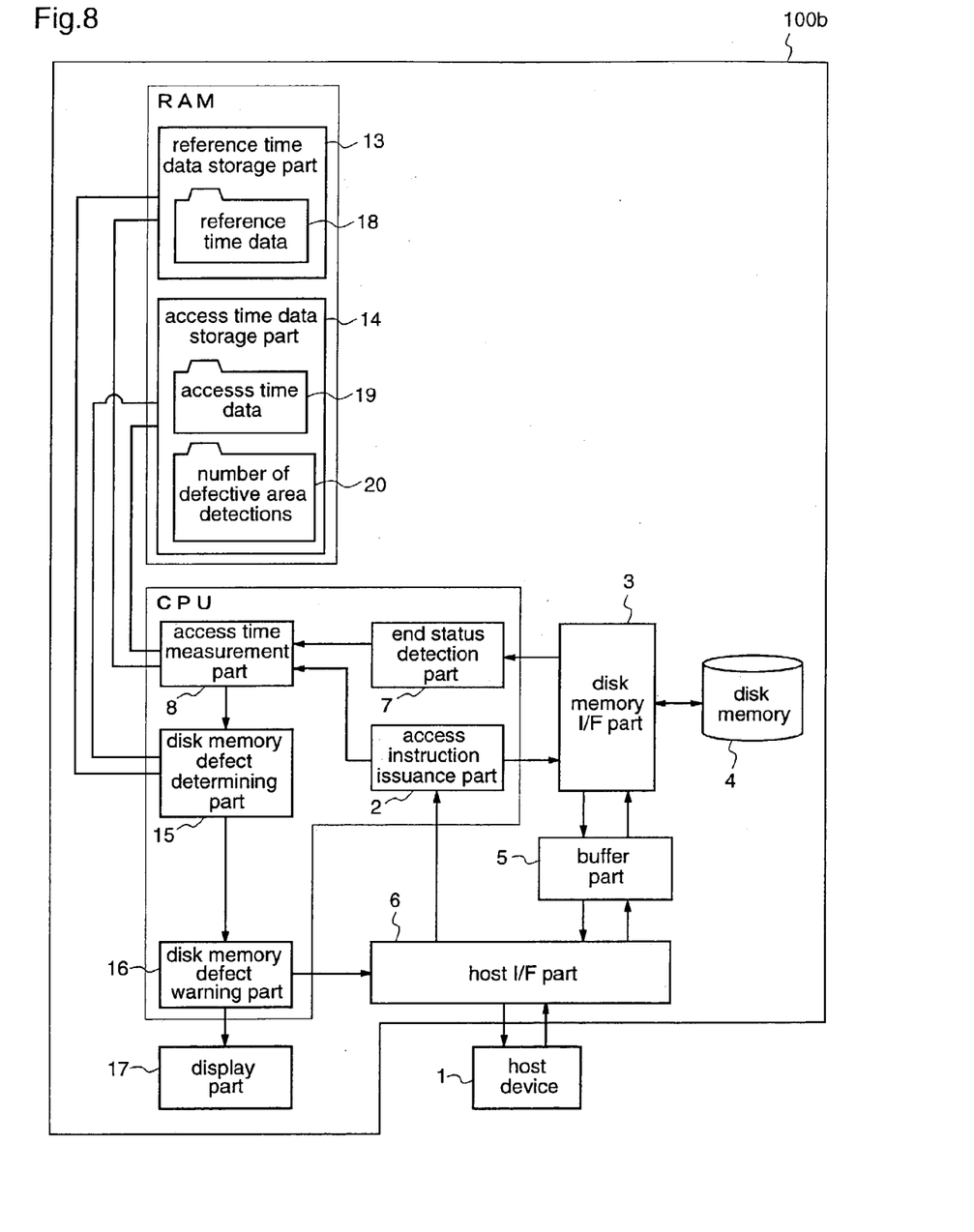
FIG. 8 is a block diagram illustrating an example of a constitution of a disk memory device according to a third embodiment of the present invention.
Figure 9:
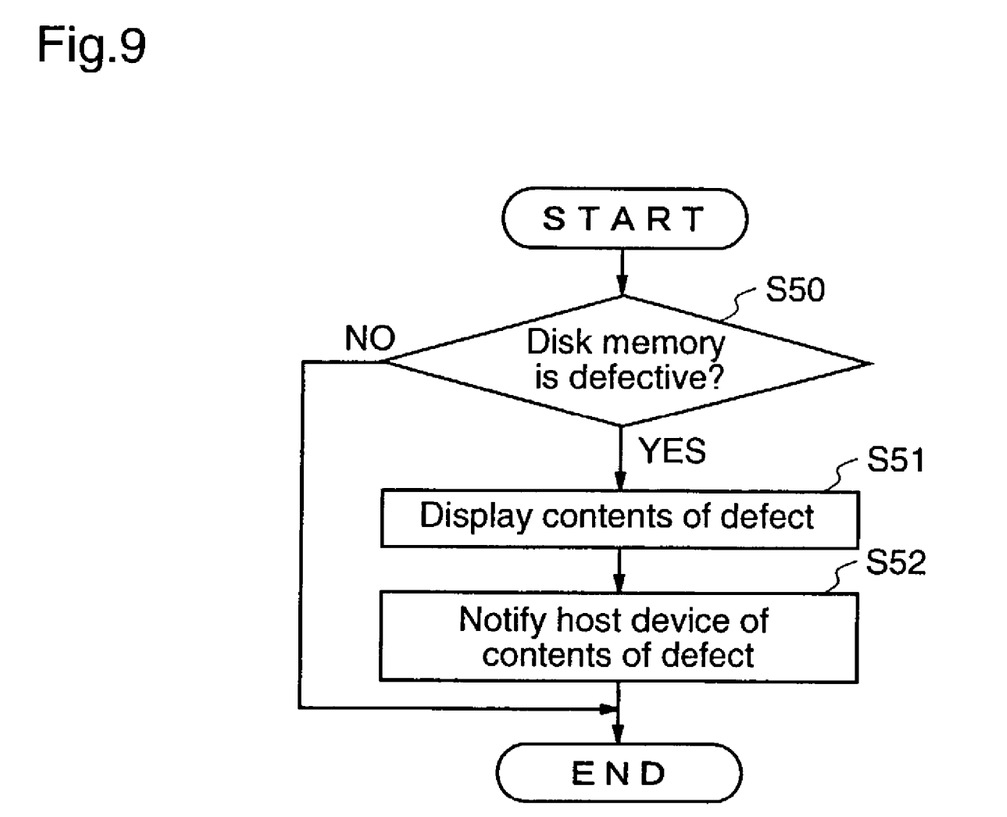
FIG. 9 is a flowchart illustrating an example of a process of the disk memory device according to the third embodiment of the invention.

FIG. 8 is a block diagram as an example illustrating a construction of the disk memory device according to the third embodiment of the present invention. In the drawing, a host device 1 outputs a test start instruction to a disk memory device 100b to instruct the same to conduct a test of an area on a disk memory 4. Further, the host device 1 outputs an access instruction to the disk memory device 100b to instruct the same to read data recorded in the disk memory 4 or to write data therein.

The disk memory device 100b according to the third embodiment of the present invention comprises an access instruction issuance part 2, a disk memory I/F part 3, the disk memory 4, a buffer part 5, a host I/F part 6, an end status detection part 7, an access time measurement part 8, a reference time data storage part 13, an access time data storage part 14, a disk memory defect determining part 15, a disk memory defect warning part 16, and a display part 17.

The disk memory device 100b according to the third embodiment of the present invention is different from the disk memory device 100a described for the second embodiment in that the disk memory defect warning part 16 and the display part 17 are further provided. The same constituents as those of the disk memory device 100a according to the second embodiment, except for the disk memory defect warning part 16 and the display part 17, operate in like manners as those of the disk memory device 100a according to the second embodiment, and thus they are denoted by the same reference numerals and descriptions thereof will be omitted.

When the disk memory defect determining part 15 detects the existence of a defective area in the disk memory 4 or performance degradation of the whole disk memory 4, and determines that the disk memory 4 is defective, the disk memory defect warning part 16 notifies the display part 17 of the determination by the disk memory defect determining part 15. Further, the disk memory defect warning part 16 notifies the host device 1 of the determination through the host I/F part 6.

On the basis of the notification from the disk memory defect warning part 16 that the disk memory 4 is defective, the display part 17 displays contents of the notification on an LED, a display or the like. Not only the visual display part 17 such as an LED or a display, but also a display part using a sound source such as a buzzer sound or a voice are possible.

Next, a process of the disk memory device 100*b* according to the third embodiment of the present invention will be described with reference to a flowchart shown in FIG. 9.

When the disk memory defect determining part 15 detects the existence of a defective area in the disk memory 4 or performance degradation of the whole disk memory 4, and determines that the disk memory 4 is defective (step S50), the disk memory defect warning part 16 displays the determination that the disk memory 4 is defective and contents of the defect via the display part 17 (step S51).

Then, the disk memory defect warning part 16 notifies the host device 1 of the determination that the disk memory 4 is defective and the contents of the defect through the host I/F part 6 (step S52).

As described above, according to the third embodiment, the disk memory device 100*b* is provided with the access time measurement part 8 for measuring a time for reading or writing a prescribed amount of data, the access time data storage part 14 for storing the measured access time as the access time data 19, the reference time data storage part 13 for storing the access time which is measured for the whole access area at manufacture of the disk memory device, as the reference time data 18, the disk memory defect determining part 15 for comparing the access time data 19 with the reference time data 18 to determine the existence of defective area in the disk memory 4 or performance degradation thereof, thereby determining a defect of the disk memory device 100*b*, and the disk memory defect warning part 16 for notifying the host device 1 or the display part 17 of the defect of the disk memory device 100*b* when it is judged that the disk memory device 100*b* is defective from the result of the determination by the disk memory defect determining part 15. Therefore, by detecting performance degradation after manufacture of the disk memory device and notifying the host device 1 or a user of the degradation, it is possible to take a measure such as saving data in the disk memory device 100*b* into another recording medium, or exchanging the disk memory device 100*b*.

APPLICABILITY IN INDUSTRY

A disk memory device, a disk memory device defect determining method, and a recording medium storing a program that enables a computer to execute the method according to the present invention are extremely useful for reproducing video without interruption or recording pictures without lack of frame when the disk memory device is employed for recording/reproducing AV data.

The invention claimed is:

1. A disk memory device comprising:
   an access time measurement part operable to measure a time for reading or writing a prescribed amount of data;
   an access time data storage part operable to store the measured access time;
   a reference time data storage part operable to store data of an access time which is measured for each of all access areas at manufacture of the disk memory device, as reference time data; and
   a defect determining part operable to compare the access time data, which is measured for each access area at use of the disk memory device, with the reference time data, which is measured at manufacture of the disk memory device, to determine a defect of the disk memory device.

2. A disk memory device defect determining method comprising:
   measuring a time for reading or writing a prescribed amount of data and storing the measured access time as access time data;
   storing data of an access time which is measured for each of all access areas at manufacture of a disk memory device, as reference time data; and
   comparing the stored access time data, which is measured for each access area at use of the disk memory device, with the stored reference time data, which is measured at manufacture of the disk memory device, to determine a defect of the disk memory device.

3. A computer readable medium in which a program for making a computer execute a defect determining process of a disk memory device is stored, wherein
   the defect determining process comprises:
   measuring a time for reading or writing a prescribed amount of data and storing the measured access time as access time data;
   storing data of an access time which is measured for each of all access areas at manufacture of the disk memory device, as reference time data; and
   comparing the stored access time data, which is measured for each access area at use of the disk memory device, with the stored reference time data, which is measured at manufacture of the disk memory device, to determine a defect of the disk memory device.

4. A disk memory device comprising:
   an access time measurement part operable to measure a time for reading or writing a prescribed amount of data;
   an access time data storage part operable to store the measured access time;
   a reference time data storage part operable to store data of an access time which is measured for each of all access areas at manufacture of the disk memory device, as reference time data;
   a defect determining part operable to compare the access time data, which is measured for each access area at use of the disk memory device, with the reference time data, which is measured at manufacture of the disk memory device, to determine a defect of the disk memory device; and
   a defect notification part operable to notify a host device for controlling the disk memory device or a display part for displaying data, of the defect of the disk memory device when it is judged that the disk memory device is defective from the result of the determination by the defect determining part.

5. A disk memory device defect determining method comprising:
   measuring a time for reading or writing a prescribed amount of data and storing the measured access time as access time data;
   storing data of an access time which is measured for each of all access areas at manufacture of a disk memory device, as reference time data;

comparing the stored access time data, which is measured for each access area at use of the disk memory device, with the stored reference time data, which is measured at manufacture of the disk memory device, to determine a defect of the disk memory device; and notifying a host device for controlling the disk memory device or a display part for displaying data, of the defect of the disk memory device when it is determined that the disk memory device is defective in the defect determination.

6. A computer readable medium in which a program for making a computer execute a defect determining process of a disk memory device is stored, wherein the defect determining process comprises:

measuring a time for reading or writing a prescribed amount of data and storing the measured access time as access time data;

storing data of an access time which is measured for each of all access areas at manufacture of the disk memory device, as reference time data;

comparing the stored access time data, which is measured for each access area at use of the disk memory device, with the stored reference time data, which is measured at manufacture of the disk memory device, to determine a defect of the disk memory device; and notifying a host device for controlling the disk memory device or a display part for displaying data, of the defect of the disk memory device when it is determined that the disk memory device is defective in the defect determination.

* * * * *